United States Patent [19]
Appel et al.

[11] Patent Number: 5,489,936
[45] Date of Patent: Feb. 6, 1996

[54] FAST SCAN SPOT CORRECTION IN A POLYGON ROS USING PWM

[75] Inventors: James J. Appel, Brighton; Aron Nacman, Penfield, both of N.Y.

[73] Assignee: Xerox Corporation, Stamford, Conn.

[21] Appl. No.: 971,033

[22] Filed: Nov. 3, 1992

[51] Int. Cl.⁶ .............................. G01D 9/42; H04N 1/21; H04N 1/04
[52] U.S. Cl. ...................... 347/248; 347/252; 358/298; 358/481
[58] Field of Search ...................... 346/108, 160; 358/298, 528, 534, 481; 347/247, 252, 249, 131, 132, 248

[56] References Cited

U.S. PATENT DOCUMENTS

| | | | |
|---|---|---|---|
| 4,034,408 | 7/1977 | Starkweather | 346/108 |
| 4,251,821 | 2/1981 | Kimura | 346/108 |
| 4,257,053 | 3/1981 | Gilbreath | 346/108 |
| 4,799,069 | 1/1989 | Sasaki et al. | 346/108 |
| 4,941,721 | 7/1990 | Banton et al. | 350/6.8 |
| 5,117,243 | 5/1992 | Swanberg et al. | 346/108 |
| 5,144,338 | 9/1992 | Sakano | 346/108 |
| 5,184,226 | 2/1993 | Cianciosi | 358/296 |
| 5,189,441 | 2/1993 | Fukui et al. | 346/160 |
| 5,241,330 | 8/1993 | Kawabata et al. | 346/108 |

*Primary Examiner*—Peter S. Wong
*Assistant Examiner*—Randy W. Gibson
*Attorney, Agent, or Firm*—Finnegan, Henderson, Farabow, Garrett & Dunner

[57] ABSTRACT

The raster scanning system of the present invention includes a beam generator which generates a beam of radiant energy in response to a drive signal. The drive signal comprising a series of pulses. The raster scanning system further includes a polygon having an overfilled facet design in which a plurality of facets are at least partially positioned in the optical path of the beam of radiant energy regardless of the rotational position of the polygon. The polygon being adapted to scan a spot across a beam receiving surface. Additionally the raster scanning system includes spot size correcting means for maintaining a constant spot size of the scanned spot by modulating the pulse width of the drive signal provided to the beam generator.

28 Claims, 5 Drawing Sheets

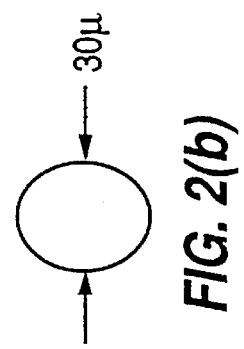
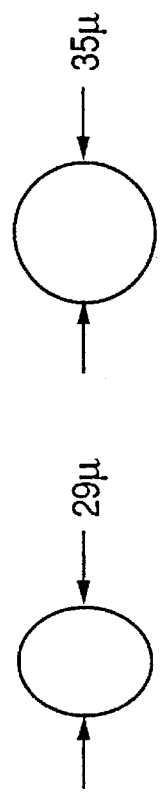
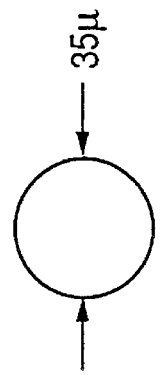
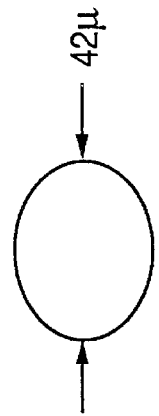
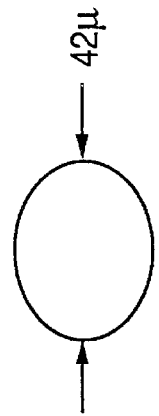
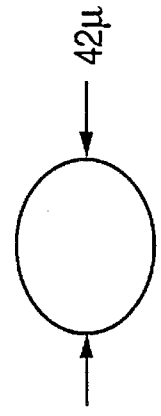
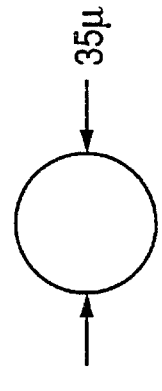
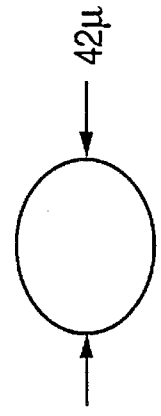
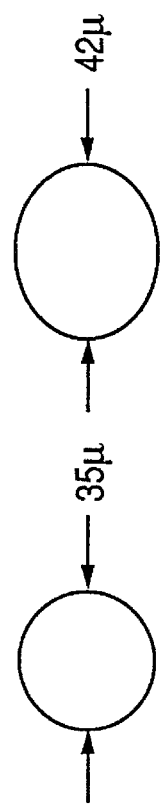

FAST SCAN SPOT CORRECTION IN A POLYGON ROS USING PWM

BACKGROUND OF THE INVENTION

1. Field of the Invention

The invention relates to a raster scanning system and, more particularly, to a scanning system having a tangentially offset overfilled polygon ROS and spot size correction circuitry for modulating the pulse width of a drive signal for the source of radiant energy of the scanning system.

2. Discussion of the Related Art

Most conventional raster output scanners (ROS) utilize a rotating polygon having flat reflective surfaces, or facets, in parallel with the axis of rotation of the polygon. In a typical system, a light beam is emitted from a light source such as a helium-neon laser. The light beam is directed through pre-polygon conditioning optics, modulated according to an input electrical signal, and projected onto the rotating polygon surfaces. In these conventional ROS systems, the pre-polygon optics typically are incorporated in an underfilled facet design; e.g., the light beam directed against the rotating polygon illuminates only a portion of each rotating facet.

Overfilled facet designs, where the light beam at least partially illuminates more than one facet at all times, have been used to some degree but have not gained wide acceptance. Comparing the two designs, in an overfilled design, the facet size required to produce a given spot size at the image plane is greatly reduced, thus allowing many more facets to be accommodated on the same diameter polygon. Therefore, for a given polygon rotation speed, an overfilled polygon ROS will generate a higher scan line rate, and will thus be capable of running at higher process speeds. Increasing process speed capability is a significant advantage in that it enables the use of a single diode in an overfilled polygon ROS at significantly higher process speeds than in an underfilled polygon ROS.

Both overfilled and underfilled polygon ROS's, however, have an inherent problem in that sagittal offset of the pre-polygon beam introduces bow into the scan line. Although there are some other solutions to this problem, the most common solution is to use a tangentially offset design.

However, there exists a problem in using the tangentially offset overfilled design in that the spot size diameter in the direction of scan changes from the start of scan (SOS) position to the end of scan (EOS) position. This change in spot size occurs due to the change in the apparent width of the facet exposed to the light beam. The change in the apparent width of the facet results from the rotation of the polygon. In an overfilled design, since the facet defines the limiting aperture in the fast scan direction, the width of the spot at a photoreceptor plane is dependent on the apparent width of the facet. The variation in the spot size diameter in the fast scan direction can be as large as 20%. Such variation makes the tangentially offset overfilled design unacceptable for high quality ROS systems.

SUMMARY OF THE INVENTION

The present invention has been made in view of the above circumstances and has as an object providing a tangentially offset overfilled design for a ROS system wherein the spot size of the scanned spot is maintained from the SOS position to the EOS position.

A further object of the present invention is a high quality ROS system having an increased scan line rate and being capable of operating at high process speeds.

Another object of the present invention is a high quality ROS system having pulse width modulation (PWM) electronics which stretch the pixel width by varying the exposure time by a different amount at every point in the scan to make the pixel width constant across the entire scan line.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the raster scanning system of this invention comprises beam generating means for generating a beam of radiant energy in response to a drive signal comprising a series of pulses, a polygon having an overfilled facet design wherein a plurality of facets are at least partially positioned in the optical path of the beam of radiant energy, and wherein the polygon is adapted to scan a spot across a beam receiving surface and spot size correcting means for maintaining a constant spot size of the scanned spot by modulating the pulse width of the drive signal provided to the beam generating means.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIGS. 2(a) through 2(j) are diagrams illustrating the variations in the diameter of a scan spot in the fast scan direction at various portions along the scan line that result from modulating the pulse width of the driving signal of a beam generator;

DETAILED DESCRIPTION OF THE PREFERRED EMBODIMENTS

Figure 1:
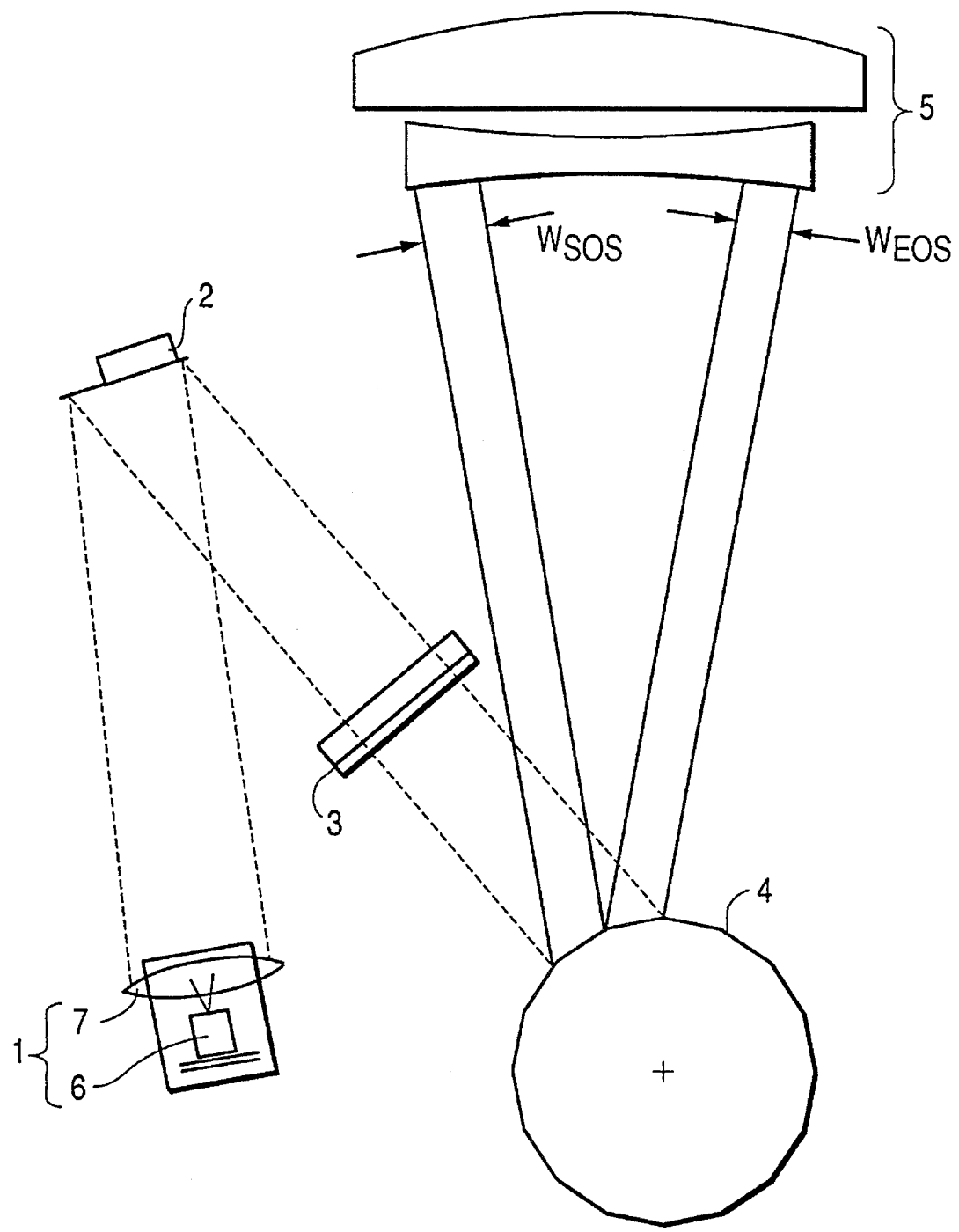
FIG. 1 is a top view of the raster scanning system constructed according to the present invention.

As shown in FIG. 1, the raster scanning system of the present invention includes beam generating means 1, deflecting mirror 2, pre-polygon lens unit 3, polygon 4, and post-polygon imaging lens unit 5. Beam generating means 1 may be any radiant energy source capable of forming a beam of radiant energy in response to a driving signal which comprises a series of pulses. Preferably, beam generating means 1 comprises a laser diode 6 and a collimating lens unit 7.

Although deflecting mirror 2 is shown in FIG. 1, it is not necessary to include deflecting mirror 2 for purposes of the present invention unless design constraints require specific positioning of beam generating means 1 such that deflecting mirror 2 would be necessary to deflect the beam of radiant energy at polygon 4.

Pre-polygon lens unit 3 typically comprises a cylindrical lens, and post-polygon imaging lens unit 5 comprises an f/θ imaging lens unit which has a toroidal surface capable of performing wobble correction. A cylindrical mirror may also be used instead of the toroidal surface. Such lens systems are well-known in the art and will not be further discussed.

Polygon 4 is designed to have a large number of facets consistent with an overfilled design architecture, and is tangentially offset (i.e., the axis about which polygon 4 rotates is perpendicular to a plane through which the beam of radiant energy is scanned). As shown in FIG. 1, in the overfilled design architecture, the radiant energy beam at least partially illuminates more than one facet regardless of the rotational position of polygon 4.

Typically, a system such as that shown in FIG. 1 is used to form an image on a photoreceptor (not shown) which is positioned such that the beam emitted from the post-polygon lens unit 5 is incident on the surface of the photoreceptor.

FIGS. 2(a) and 2(b) show the relative size of a static scanning spot as would be seen by the photoreceptor at the SOS and EOS positions, respectively. It should be noted that the dimensions given are provided for example only, and that the present invention is not limited to the dimensions given. By comparing FIGS. 2(a) and 2(b) it is clear that the diameter of the spot size in the fast scan direction increases from the SOS position to the EOS position. This increase in dimension results from the relative orientation of those facets of polygon 4 which are within the optical path of the radiant energy beam. Because the relative orientation of the facets changes as polygon 4 rotates, the apparent width of the facets change between the SOS and EOS positions.

FIG. 2(c) shows the dynamic spot size at the SOS position with an 8 ns exposure time. Comparing FIGS. 2(a) and 2(c), the diameter of the spot in the fast scan direction is larger when the system is operating in a dynamic state than when the system is in a static state. This difference is caused by the velocity smear produced by the spot moving on the photoreceptor.

FIG. 2(d) shows the dynamic spot size at the SOS position with a 14 ns exposure time. Comparing FIGS. 2(c) and 2(d), the diameter of the spot in the fast scan direction is larger when the exposure time is increased. FIG. 2(e) shows the dynamic spot size at the EOS position with an 8 ns exposure time, and FIG. 2(f) shows the dynamic spot size at the EOS position with a 14 ns exposure time. Comparing FIG. 2(c) with FIG. 2(e) and FIG. 2(d) with FIG. 2(e), it is clear that the change in the diameter of the spot size in the fast scan direction increases from the SOS position to the EOS position regardless of whether the system is in a dynamic state or a static state, or whether the exposure time is increased or decreased for each given scan line so long as the exposure time is constant for the scan line.

In order to correct variance in the spot size diameter, spot size correcting means is employed to maintain a constant dynamic spot size diameter at every position throughout the entire scan line. The spot size correcting means accomplishes this goal by varying the exposure time during the scanning of each scan line. The exposure time is varied by modulating the pulse width of the drive signal which drives beam generating means 1.

The effects of varying the exposure time are illustrated in FIGS. 2(g)–(j). FIG. 2(g) shows the dynamic spot size at the SOS position with a 10 ns exposure time. FIG. 2(h) shows the dynamic spot size at the SOS position with a 16 ns exposure time. FIG. 2(i) shows the dynamic spot size at the EOS position with an 8 ns exposure time. FIG. 2(j) shows the dynamic spot size at the EOS position with a 14 ns exposure time. Comparing FIG. 2(g) with FIG. 2(i) and FIG. 2(h) with FIG. 2(j), the diameter of the spot in the fast scan direction is maintained constant when the exposure time is decreased from the SOS position to the EOS position.

Figure 3:
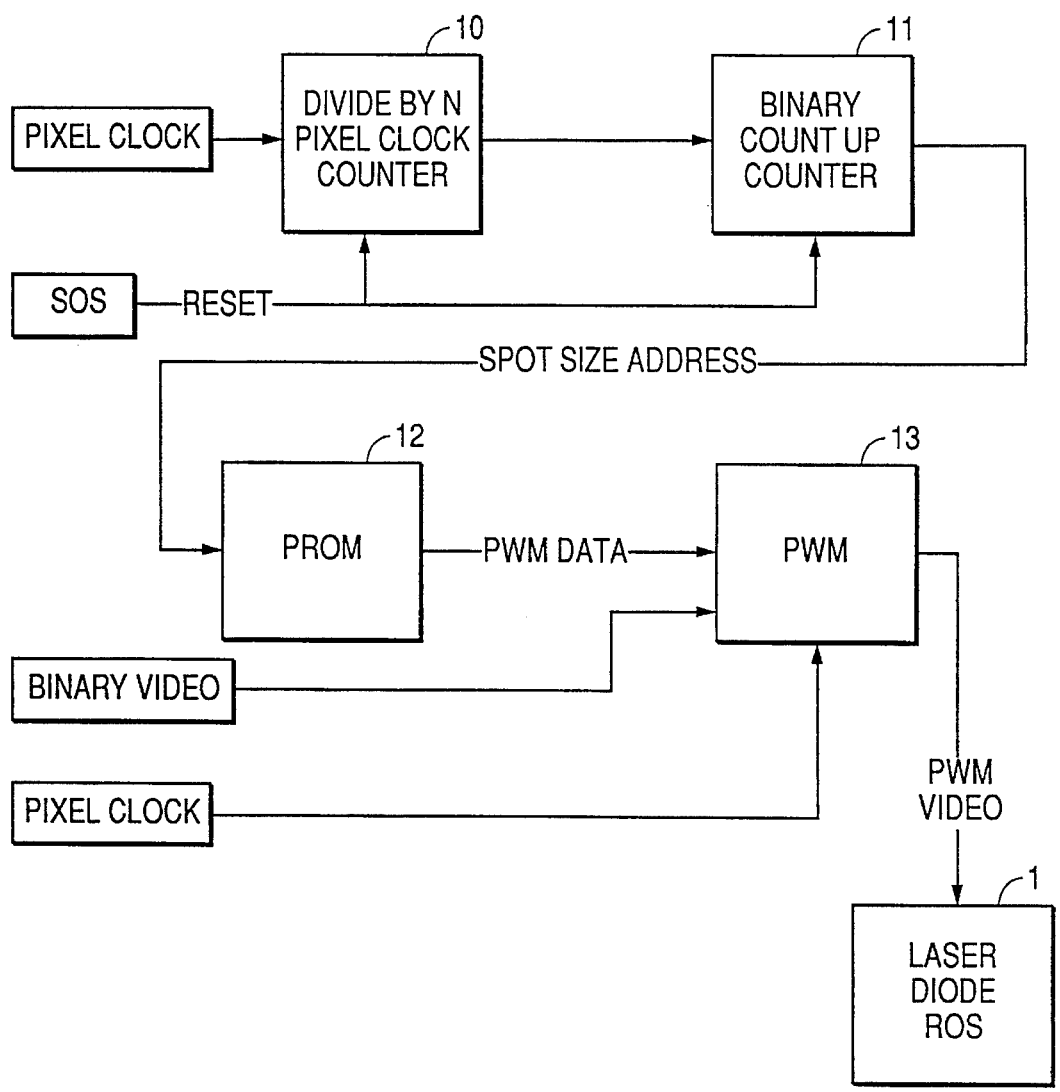
FIG. 3 is a schematic illustration of the spot size correcting means constructed according to a first embodiment of the present invention.
Figure 5:
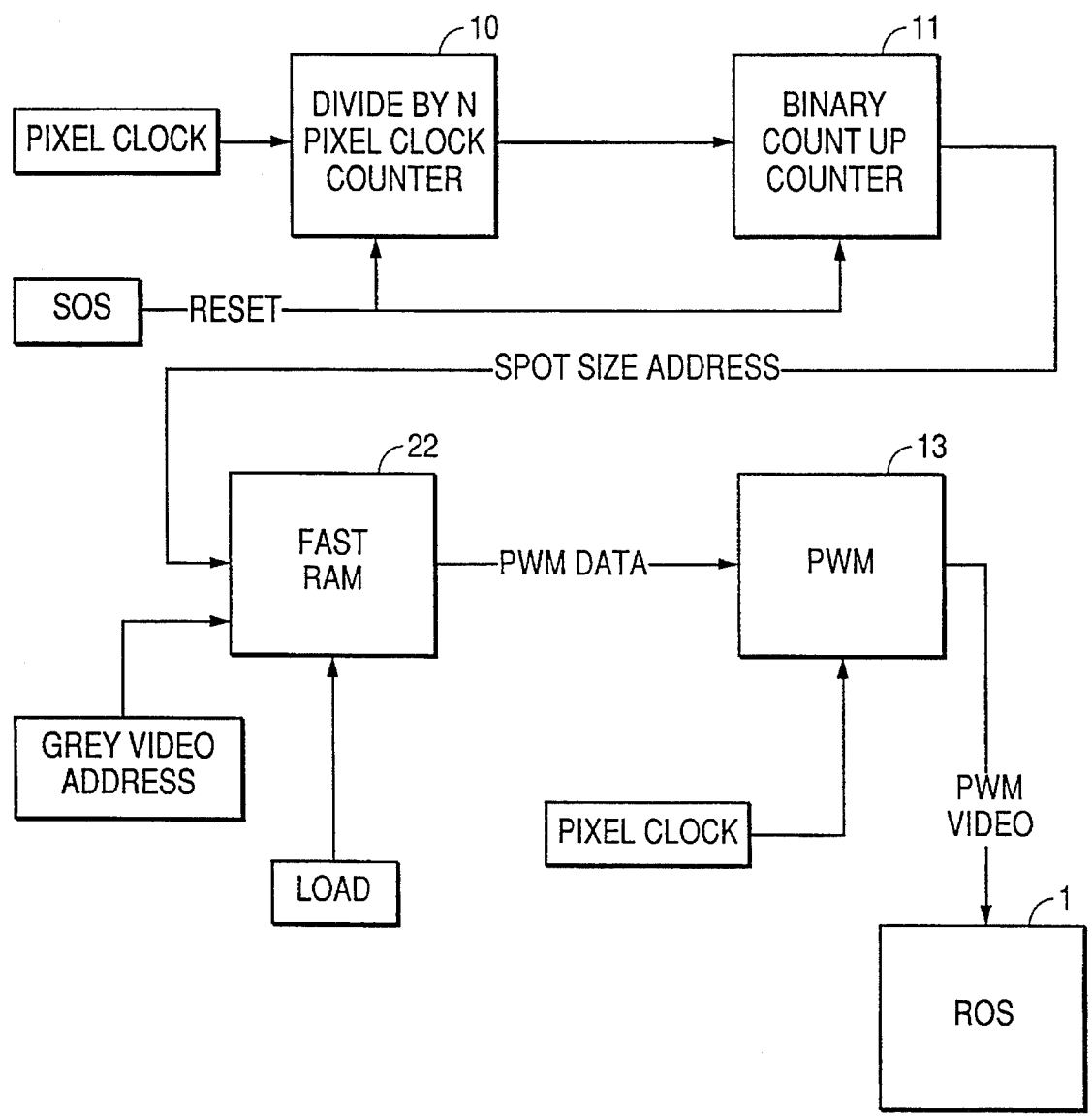
FIG. 5 is a schematic illustration of the spot size correcting means constructed according to a second embodiment of the present invention.

As embodied herein, spot size correcting means for maintaining a constant spot size of the scanned spot may comprise the circuitry of either the first embodiment of the invention or the second embodiment which are shown in FIGS. 3 and 5, respectively. The first embodiment is designed for use when a binary video signal is used to modulate the beam in order to produce an image on a photoreceptor, and the second embodiment is designed for use when a gray video signal is used to modulate the beam in order to produce an image on a photoreceptor.

As shown in FIG. 3, in the first embodiment, the spot size correcting means comprises divide by N pixel clock counter 10, binary count up counter 11, programmable read only memory (PROM) 12, and pulse width modulator (PWM) 13. PWM 13 may be any circuit capable of producing the output shown in FIG. 4 in response to the input signals also shown in FIG. 4. One commercially available PWM is AD9560 available from Analog Devices.

Figure 4:
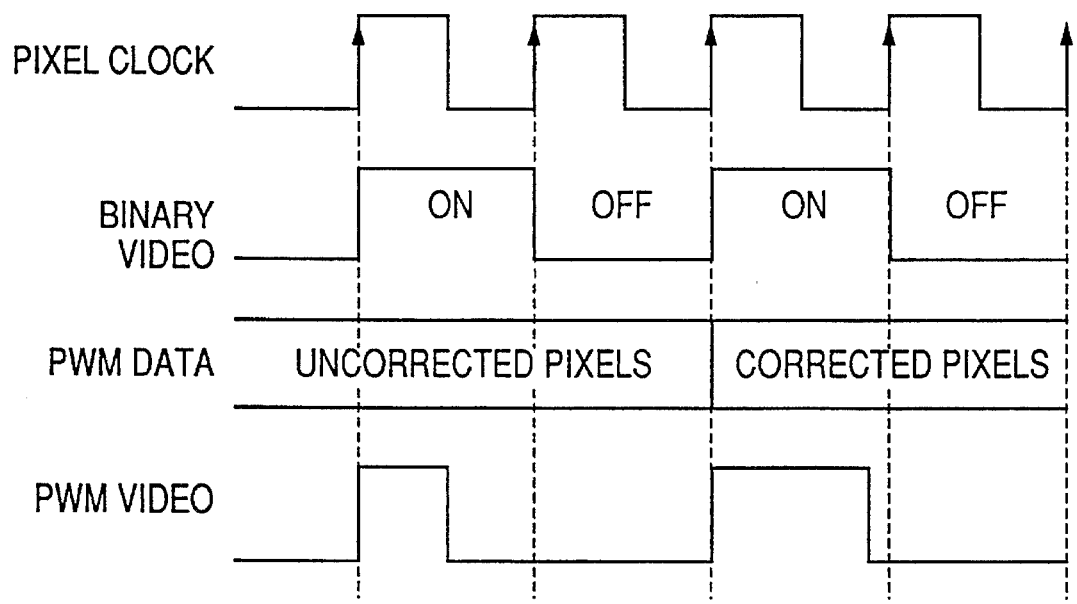
FIG. 4 is timing diagram illustrating the response of the spot size correcting means shown in FIG. 3 to exemplified input signals.

Divide by N pixel clock counter 10 receives a pixel clock signal (an example of the pixel clock signal is shown in FIG. 4), and divides the frequency of the pixel clock signal by N to output a correction frequency signal. N is a preset number selected to represent the frequency at which spot size correction will occur within one scan line. For example, if spot size correction were desired at ½ inch intervals along the scan line and the fast scan resolution is 600 spots per inch (SPI), N would be chosen to be 300. Thus, for every 300 pixel pulses in the pixel clock signal, divide by N pixel clock counter 10 would output a pulse as the correction frequency signal. Divide by N pixel clock counter 10 also receives an SOS signal as a reset in order to ensure that the counting of pixel pulses of the pixel clock signal resets to zero at the beginning of each subsequent scan line.

The correction frequency signal is received by binary count up counter 11 which counts the number of pulses received for each scan line. Thus, each set of N pixels have associated therewith a unique spot size address output from binary count up counter 11. Binary count up counter 11 also receives an SOS signal as a reset in order to reset the counter to zero upon the start of each subsequent scan line.

PROM 12 receives the spot size address signal from binary count up counter 11 and transmits pulse width modulation (pwm) data stored in the address indicated in the spot size address signal to PWM 13. Before the system is operated, the pwm data is determined for each scan line position by measuring the static spot diameter for several points along the scan line and calculating the amount of pixel stretching necessary at each point to make the pixel width at that point equal to its maximum static width, and is loaded in PROM 12. LAW OFFICES PWM 13 receives the pwm data from PROM 12 as well as the pixel clock signal and a binary video signal. For purposes of illustration, the pixel clock signal, binary video signal, and pwm data which are input to PWM 13, are shown in FIG. 4. FIG. 4 further shows the drive signal (or pwm video signal) that PWM 13 would output in response to the illustrated input signals. In the example shown in FIG. 4, four pixels are shown, two of which are uncorrected and the other two are corrected. The number of pulse widths possible depends upon the number of states in the pwm data and the resolution of the PWM 13. For example, if the pwm data had four lines and the pulse width modulation circuit had enough resolution, then 16 ($2^4$) pulse widths would be possible.

As shown in FIG. 5, in the second embodiment, various components are identical to the components in the first embodiment. These identical components are identified by the same reference numerals. The second embodiment, which is designed for use when a gray video signal is utilized, differs from the first embodiment in that PROM 12 is replaced with fast random access memory (RAM) 22 and the input gray video signal is used as an address signal along with the spot size address signal in order to identify a unique address within fast RAM 22 for all gray states at all spot size addresses. Additionally, PWM 13 generates the drive signal (pwm video signal) solely in response to pwm data received from fast RAM 22 and the pixel clock signal.

In the second embodiment, fast RAM 22 is used in place of PROM 12 because the gray data changes at the pixel rate and it is necessary that the access time be less than the pixel period. The number of pulse widths possible depends upon the number of states in the gray data and the number of bits representing the spot size address. For example, if there were four bits representing the spot size address and four bits of gray data addressing fast RAM 22, then 256 possible pulse widths could be defined in fast RAM 22.

Figure 6:
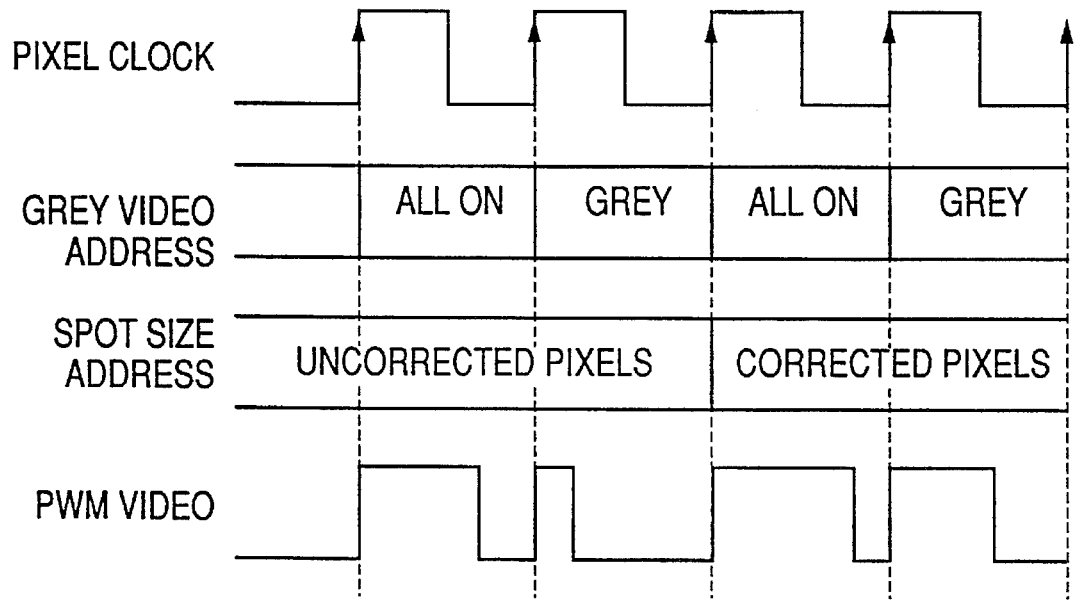
FIG. 6 is timing diagram illustrating the response of the spot size correcting means shown in FIG. 5 to exemplified input signals.

FIG. 6 illustrates an example of the operation of the second embodiment. In the example shown, there are three possible gray states: all on; gray; and all off. Four pixels are shown in the example, two of which are uncorrected and the other two are corrected.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A raster scanning system comprising:
    beam generating means for generating a beam of radiant energy in response to a drive signal comprising a series of pulses, the beam forming a spot where the beam hits a surface;
    a polygon having an overfilled facet design for deflecting the beam of radiant energy and scanning the spot across a beam-receiving surface; and
    spot sizing correcting means for maintaining a constant spot size of the scanned spot by modulating a pulse width of the drive signal provided to said beam generating means,
    wherein said spot size correction means comprises:
        means for generating a correction frequency signal by dividing the frequency of an input pixel clock signal by N, wherein N is a predetermined number representing the frequency at which spot size correction will occur within one scan line;
        means for generating a spot size address signal by counting the number of pulses of the correction frequency signal occurring after the start of scan line signal is received;
        memory means for transmitting pulse width modulation data in response to the spot size address signal; and
        pulse width modulation means for modulating the pulse width of the drive signal in response to the pulse width modulation data.

2. The raster scanner system of claim 1, wherein said pulse width modulation means further modulates the drive signal in response to a binary video signal representing an image to be formed by the raster scanner system.

3. The raster scanner system of claim 2, wherein said memory means comprises a programmable read only memory.

4. The raster scanner system of claim 1, wherein said memory means transmits the pulse width modulation data in response to the spot size address signal and a gray video address signal representing an image to be formed by the raster scanner system.

5. The raster scanner system of claim 4, wherein said memory means comprises a fast random access memory.

6. The raster scanner system of claim 1, wherein said polygon rotates about an axis which is perpendicular to a plane in which the beam of radiant energy is scanned.

7. The raster scanner system of claim 1, wherein said beam generating means comprises a laser diode.

8. The raster scanner system of claim 1, wherein said polygon has an overfilled facet design in which a plurality of facets are at least partially positioned in the optical path of the beam of radiant energy regardless of the rotational position of said polygon.

9. A method for maintaining a constant spot size of a scanned spot of a raster scanning system, comprising the steps of:
    generating a beam of radiant energy in response to a drive signal comprising a series of pulses;
    scanning a spot across a beam receiving surface by reflecting the beam of radiant energy off a polygon having an overfilled facet design and positioned in the optical path of the beam of radiant energy; and
    modulating the pulse width of the drive signal in order to maintain a constant spot size of the scanned spot,
    wherein said step of modulating the pulse width of the drive signal comprises the steps of:
        generating a correction frequency signal by dividing the frequency of an input pixel clock signal by N, wherein N is a predetermined number representing the frequency at which spot size correction will occur within one scan line;
        generating a spot size address signal by counting the number of pulses of the correction frequency signal occurring after the start of scan line signal is received;
        transmitting pulse width modulation data in response to the spot size address signal; and
        modulating the pulse width of the drive signal in response to the pulse width modulation data.

10. The method of claim 9, wherein said modulating the pulse width of the drive signal further comprises the step of further modulating the drive signal in response to a binary video signal representing an image to be formed by the raster scanner system.

11. The method of claim 10, wherein said memory comprises a programmable read only memory.

12. The method of claim 9, wherein said memory transmits the pulse width modulation data in response to the spot size address signal and a gray video address signal representing an image to be formed by the raster scanner system.

13. The method of claim 12, wherein said memory comprises a fast random access memory.

14. The method of claim 9, wherein said polygon rotates about an axis which is perpendicular to a plane in which the beam of radiant energy is scanned.

15. The method of claim 9, wherein said beam of radiant energy is generated by a laser diode.

16. The method of claim 9, wherein said polygon has an overfilled facet design in which a plurality of facets are at least partially positioned in the optical path of the beam of radiant energy regardless of the rotational position of said polygon.

17. A tangentially offset raster scanning system comprising:

a laser diode for generating a light beam in response to a drive signal comprising a series of pulses;

a polygon having an overfilled facet design wherein a plurality of facets are at least partially positioned in the optical path of the light beam regardless of the rotational position of said polygon, and wherein the polygon is adapted to deflect the beam of radiant energy and to scan a spot across a light beam receiving surface;

spot size correcting means for maintaining a constant spot size of the scanned spot by modulating the pulse width of the drive signal provided to said laser diode, said spot size correcting means including means for generating a correction frequency signal by dividing the frequency of an input pixel clock signal by N, wherein N is a predetermined number representing the frequency at which spot size correction will occur within one scan line, means for generating a spot size address signal by counting the number of pulses of the correction frequency signal occurring after a start of scan line signal is received, memory means for transmitting pulse width modulation data in response to the spot size address signal, and pulse width modulation means for modulating the pulse width of the drive signal in response to the pulse width modulation data.

18. The raster scanner system of claim 17, wherein said pulse width modulation means further modulates the drive signal in response to a binary video signal representing an image to be formed by the raster scanner system.

19. The raster scanner system of claim 18, wherein said memory means comprises a programmable read only memory.

20. The raster scanner system of claim 17, wherein said memory means transmits the pulse width modulation data in response to the spot size address signal and a gray video address signal representing an image to be formed by the raster scanner system.

21. The raster scanner system of claim 20, wherein said memory means comprises a fast random access memory.

22. A raster scanning system comprising:

beam generating means for generating a beam of radiant energy in response to a drive signal comprising a series of pulses, the beam forming a spot where the beam hits a surface;

a polygon having an overfilled facet design wherein a plurality of facets are at least partially positioned in the optical path of the beam of radiant energy regardless of the rotational position of said polygon, and wherein the polygon is for deflecting the beam of radiant energy and scanning the spot across a beam-receiving surface; and spot sizing correcting means for maintaining a constant spot size of the scanned spot by modulating a pulse width of the drive signal provided to said beam generating means, wherein said spot size correction means comprises:

means for generating a correction frequency signal by dividing the frequency of an input pixel clock signal by N, wherein N is a predetermined number representing the frequency at which spot size correction will occur within one scan line;

means for generating a spot size address signal by counting the number of pulses of the correction frequency signal occurring after the start of scan line signal is received;

memory means for transmitting pulse width modulation data in response to the spot size address signal; and pulse width modulation means for modulating the pulse width of the drive signal in response to the pulse width modulation data.

23. The raster scanner system of claim 22, wherein said pulse width modulation means further modulates the drive signal in response to a binary video signal representing an image to be formed by the raster scanner system.

24. The raster scanner system of claim 23, wherein said memory means comprises a programmable read only memory.

25. The raster scanner system of claim 22, wherein said memory means transmits the pulse width modulation data in response to the spot size address signal and a gray video address signal representing an image to be formed by the raster scanner system.

26. The raster scanner system of claim 25, wherein said memory means comprises a fast random access memory.

27. The raster scanner system of claim 22, wherein said polygon rotates about an axis which is perpendicular to a plane in which the beam of radian energy is scanned.

28. The raster scanner system of claim 22, wherein said beam generating means comprises a laser diode.

* * * * *

UNITED STATES PATENT AND TRADEMARK OFFICE
CERTIFICATE OF CORRECTION

PATENT NO. : 5,489,936

DATED : February 6, 1996

INVENTOR(S) : APPEL et al.

It is certified that error appears in the above-indentified patent and that said Letters Patent is hereby corrected as shown below:

Claim 27, column 8, line 54, "radian" should read --radiant--.

Signed and Sealed this

Sixteenth Day of April, 1996

BRUCE LEHMAN

Attest:

Attesting Officer

Commissioner of Patents and Trademarks